(12) United States Patent
Benjamin et al.

(10) Patent No.: US 9,098,201 B2
(45) Date of Patent: Aug. 4, 2015

(54) DYNAMIC DATA PLACEMENT FOR DISTRIBUTED STORAGE

(75) Inventors: Matthew W. Benjamin, Ann Arbor, MI (US); Adam C. Emerson, Ann Arbor, MI (US); Peter Honeyman, Ann Arbor, MI (US)

(73) Assignee: COHORT FS, LLC, Ann Arbor, MI (US)

(*) Notice: Subject to any disclaimer, the term of this patent is extended or adjusted under 35 U.S.C. 154(b) by 187 days.

(21) Appl. No.: 13/530,604

(22) Filed: Jun. 22, 2012

(65) Prior Publication Data

US 2012/0331249 A1 Dec. 27, 2012

Related U.S. Application Data

(60) Provisional application No. 61/571,251, filed on Jun. 23, 2011.

(51) Int. Cl.
G06F 12/16 (2006.01)
G06F 3/06 (2006.01)

(52) U.S. Cl.
CPC .............. G06F 3/0607 (2013.01); G06F 3/067 (2013.01); G06F 3/0644 (2013.01)

(58) Field of Classification Search
CPC ...................................... G06F 3/0607
USPC ..................................... 711/1–200
See application file for complete search history.

(56) References Cited

U.S. PATENT DOCUMENTS

| 5,018,060 | A | 5/1991 | Gelb et al. |
| 6,119,118 | A * | 9/2000 | Kain et al. ................. 707/822 |
| 7,222,172 | B2 * | 5/2007 | Arakawa et al. ............ 709/224 |
| 7,315,930 | B2 | 1/2008 | Karlsson et al. |
| 7,346,734 | B2 | 3/2008 | Chen et al. |
| 2012/0303618 | A1 * | 11/2012 | Dutta et al. ................ 707/737 |

OTHER PUBLICATIONS

Weil et al. "CRUSH: Controlled, Scalable, Decentralized Placement of Replicated Data", University of California, Santa Cruz, SC2006, Nov. 2006.*
Weil et al. "CRUSH: Controlled, Scalable, Decentralized Placement of Replicated Data " SC2006, Nov. 2006, Tampa, Florida, USA.*
CRUSH: Controlled, Scalable, Decentralized Placement of Replicated Data, Weil et al. SC2006 Nov. 2006, Tampa, Florida, USA (PDF Attached).*
International Search Report, PCT/US2012/0-43781.
Honicky, R. J. and Ethen L. Miller. "Replication Under Scalable Hashing: A Family of Algorithms for Decentralized Data Distribution," *Proceedings of the 18th International Parallel and Distributed Processing Symposium*, Santa Fe, NM. Apr. 2004. http://www.ssrc.ucsc.edu/Papers/honicky-ipdps04.pdf. (10 pages).

(Continued)

*Primary Examiner* — Cheng-Yuan Tseng
*Assistant Examiner* — Zubair Ahmed
(74) *Attorney, Agent, or Firm* — Bejin Bieneman PLC

(57) ABSTRACT

A command is received to alter data storage in a cluster, along with parameters for executing the command. Information is obtained relating to one or more volumes in the cluster and information relating to devices in the cluster. A formal description of a placement function is generated that maps one or more object identifiers to a storage device set. Placement function code is generated by compiling the formal description of the placement function to computer-executable code.

19 Claims, 3 Drawing Sheets

(56) References Cited

OTHER PUBLICATIONS

Ivan Baev, Rajmohan Rajamman and Chaitanya Swamy: *Approximation Algorithms for Data Placement Problems*. (Combined version of two papers: an extended abstract by Baev and Rajaraman that appeared in the Proceedings of the 12th Annual ACM-SIAM Symposium on Discrete Algorithms, 2001, and an unpublished manuscript by Swamy.) (18 pages).

Baev, I. and Rajmohan Rajaraman. "Approximation Algorithms for Data Placement in Arbitrary Networks." (10 pages).

Honicky, R. J. and Ethan L. Miller. "RUSH: Balanced, Decentralized Distribution for Replicated Data in Scalable Storage Clusters". Storage Systems Research Center. Jack Baskin School of Engineering. University of California, Santa Cruz. (12 pages).

Weil, Sage A., Scott A. Brandt, Ethan L. Miller, and Carlos Maltzahn. "CRUSH: Controllable, Scalable, Decentralized Placement of Replicated Data". Storage Systems Research Center. Jack Baskin School of Engineering. University of California, Santa Cruz. (12 pages).

Shepler, S., M. Eisler, and D. Noveck, Eds. "RFC 5661: Network File System (NFS) Version 4 Minor Version 1 Protocol". Internet Engineering Task Force. 2010. pp. 277-334. (45 pages).

Lamport, Leslie, "The Part-Time Parliament," ACM Transactions on Computer Systems 16 (2): 133-169 (May 1998). (33 pages).

Lamport, Leslie, Generalized Consensus and Paxos (2005); Microsoft Research Technical Report MSR-TR-2005-33. (63 pages).

Revised Report on the Algorithmic Language Scheme, edited by Richard Kelsey, William Clinger, and Jonathan Rees (available on the Internet at http://schemers.org/Documents/Standards/R5RS/HTML/) (50 pages).

Jeffrey Mark Siskind, "A World-Wide Distributed Repository to Support Fine-Grained Sharing of Source Code", ftp://ftp.ecn.purdue.edu/qobi/research-statement.pdf (7 pages).

Small Business Innovation Research, SBIR Phase I: pNFS in the Cloud (pITC): A Replicated, Parallel File System for Cloud Computing, Jul. 7, 2014, https://www.sbir.gov/sbirsearch/detail/15915 (2 pages).

\* cited by examiner

DYNAMIC DATA PLACEMENT FOR DISTRIBUTED STORAGE

Certain subject matter in this application was created with support from NSF SBIR Phase I Award ID 1014137. This application claims priority to U.S. Provisional Patent Application Ser. No. 61/571,251, filed Jun. 23, 3011, and entitled "Dynamically Generated Data Placement Functions in Distributed Storage Systems," the contents of which are hereby incorporated herein by reference in their entirety.

BACKGROUND INFORMATION

Distributed computer storage systems aggregate and organize storage resources provisioned or attached at many computing systems or devices, making such computing systems or devices available, in turn, to a plurality of computing systems. In particular, storage management systems rely on capabilities of an underlying distributed computer storage system to construct logical or virtual storage units, making use of potentially many underlying physical storage elements, at potentially many computing devices on a fabric or network, in response to administrative policy. In addition, distributed computer storage systems must address the problem of directing requests to read or write data to the node designated to store that data. Further, distributed systems, particularly those including large numbers of users or large amounts of data, must contend with problems of reliability and performance.

Many systems use replication (the storage of multiple copies of an object) or parity schemes (storage of programmatically generated objects that can be used in combination with some number of remaining objects to recover one or more lost objects) to improve reliability. Such schemes become more advisable as both volumes of data and number of nodes in a storage and retrieval system grow, as the likelihood of a data error increases with the amount of data stored.

A "volume" is a logically addressable storage unit assembled from some set of underlying storage elements, according to some algorithm. Such an algorithm may be referred to as a "data placement function." In contrast with traditional logical volume managers (e.g., CMS MiniDisks, HP or Linux logical volume managers) and in contrast with RAID systems, a data placement function is mathematically general; it may involve computation (e.g., hashing), it may accept a variety of inputs or heuristics, including ones from higher-level systems (e.g., file or object storage systems), and may be sensitive to properties of an environment and/or of the data being stored.

To support efficient addressing of logical data blocks from independent computing devices, data placement functions may be globally known. However, using a globally known function to determine data placement, has drawbacks. Current placement techniques use a single static data placement function, or some family of functions each selecting one set from a family of parameters. These techniques are static in that the family of functions available to them is heavily constrained and determined by the architecture adopted in the development of the system. Current techniques also assume homogeneous hardware and homogeneity in client access across the objects in a collection. However, tiered storage systems assembled from diverse media are common, e.g., storage systems may include tape, magnetic and optical discs, non-volatile solid-state devices, and volatile DRAM devices, each with its own performance and reliability characteristics. Different objects within a set also serve differing patterns of access, from repeatedly and widely watched media files requiring high speed, low-latency sequential read access to databases requiring durability and good performance under multiple, contending writers.

DETAILED DESCRIPTION OF PREFERRED EMBODIMENTS

Introduction

A placement function may be generated according to several goals. For example, first, the placement function has the ability to use disparate methods for governing the location of data and parity, rather than being confined to a parameterization of a single method. Thus, data location and parity goals may be met in the context of a highly variable composition of clusters. Second, when new methods are developed or when administrators require custom data storage strategies, use of placement functions as disclosed herein provides the ability to instantiate these new strategies throughout a storage system without explicitly modifying each client and server.

Accordingly, an administrator may specify constraints on container (e.g., volume) parameters and placement goodness metrics so that an optimal placement decision can be made automatically. In addition, storage devices and clients can adapt to the addition or removal of storage devices automatically, thereby allowing dynamic changes to volume requirements, and minimizing the amount of data movement required to bring the storage system into balance after a change in cluster composition or volume requirements.

System Overview

Figure 1:
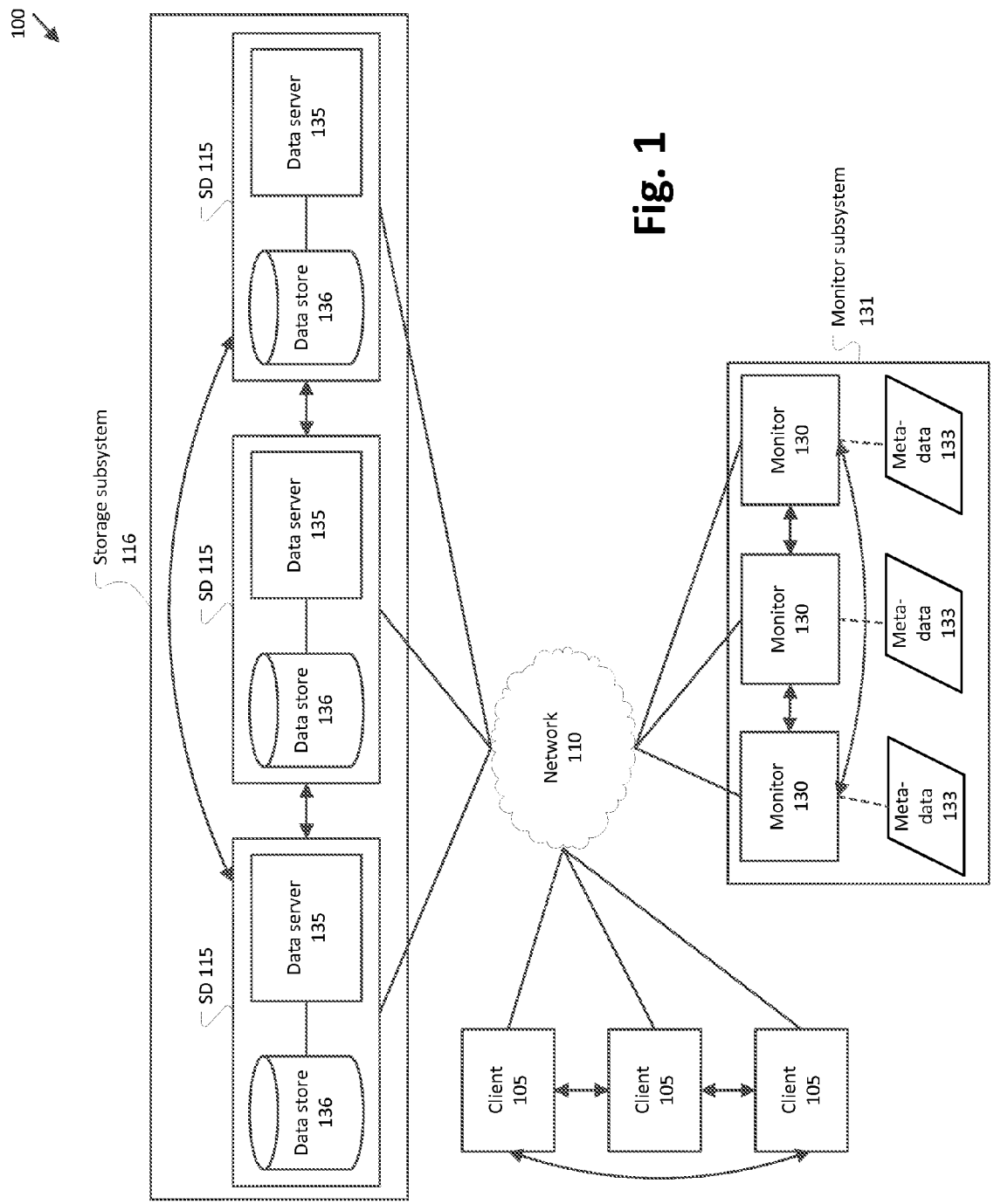
FIG. 1 is a block diagram of an exemplary storage cluster.

FIG. 1 is a block diagram of an exemplary storage cluster 100. The cluster 100 includes one or more controllers, sometimes referred to as monitors 120, one or more clients 105, and one or more storage devices (SDs) 115. One or more communication channels, represented by the packet network 110, provide for communication between cluster 100 elements.

An administrator of a distributed storage system including cluster 100 may define one or more "containers" within SDs 115, a container being generally similar to a "bucket" in the S3 cloud service provided by Amazon.com, Inc., or a "volume" in a file system). Each such container is associated with a set of minimum performance requirements. From these performance requirements, a set of one or more placement functions is generated for each container, the use of multiple procedures to be described later. In general, the terms "container" and "volume" are used interchangeably herein.

As stated above, one or more data placement functions may be dynamically generated by a controller or monitor 120, and disseminated to members of a storage cluster 100, along with supporting data either derived from the cluster 100 itself or input by an administrator. Each SD 115 receives a copy of the placement functions as computer software code and supporting data, and other SDs in the cluster 100 cooperate to access data, as well as replicate the data or construct and store parity. As used herein, "parity" conforms to the generally-accepted concept of being synthesized from file data using algorithms for error detection and correction that are used to validate and preserve the integrity of file data. Clients 105 request objects from the appropriate SDs 115 by an object identifier and in the event of failure may redirect a read or write request instantly without contacting a monitor 120.

A client 105 stores and retrieves data and parity from SDs 115. In general, a client 105 is a computing mechanism configured to receive programmatic procedures or functions, in some general purpose algorithmic representation, from a monitor 120 and execute such procedures, supplying as inputs an object identifier and shared support data. The client is then able to issue commands to one or more storage devices in order to store, modify, or read objects in accord with the sets generated by the procedure.

Accordingly, a client 105 may retrieve placement functions from metadata 122 maintained by a monitor 120 and execute the placement functions to find the data's location. Clients 105 may be of multiple varieties, e.g., simple producers or consumers of data such as an operating system file system or block device clients, or application clients of a data-access library encapsulating data access protocols such as mentioned below, e.g., a web application server or software as a service (SAAS) application, consumers and producers of data providing some capability to other clients 105 such as computing mechanisms to implement file and directory semantics or computing mechanisms to perform authentication and authorization operations), and clients 105 providing storage system access through standard means such as the Network File System or Common Internet File System protocols.

SDs 115 are semi-autonomous processes or separately managed storage devices that are responsible for storing and serving data and parity. For example, a storage device or SD 115 may include a data store 126, e.g., a file system, and also a data server 125 that is a computing mechanism configure to store, modify, and retrieve discrete, fixed-sized, or variable-sized portions of data in the data store 126, possibly with some associated metadata. The data server 125 and/or data store 126 may be referred to generically herein as SDs 115. In some implementations, SDs 115 are able to interpret procedures in a general purpose algorithmic representation and participate in replication and parity, but such is not required for all embodiments of this invention. SDs 115 form a cooperative storage subsystem 116, performing replication and parity maintenance operations between SD 115 in the cluster 100. In general, SDs 115 generate placement functions for the data they store from a global state of the cluster 100 and use the placement functions to replicate data between themselves as a fault tolerance mechanism.

SDs 115 are storage devices, i.e., storage devices with general computational capability and configured to store, modify, and retrieve blocks of arbitrary size with some associated meta data using an object identifier as a key. Thus, the term "SDs" is used herein to prevent confusion with object storage devices implementing the specific interfaces and capabilities as set forth in the SCSI command set for Object Storage Devices as developed by the Storage Networking Industry Association for the T10 committee of the International Committee for Information Technology Standards.

A monitor 120 is a computing mechanism, e.g., a computing device including a processor and a memory, the memory storing instructions executable by the processor for performing operations such as those herein ascribed to a monitor 120 or at least some of the operations ascribed to a monitor subsystem 121. Collectively, the monitors 120 may cooperate to provide a view of the cluster 100. For example, monitors 120 generally form a cooperative monitor subsystem 121, coordinating through some consistency mechanism, e.g., the PAXOS algorithm published by Leslie Lamport, to maintain a global view of cluster 100 state, e.g., of layout, composition, and generated placement functions. The PAXOS algorithm is described, for example, in Lamport, Leslie, "The Part-Time Parliament," ACM Transactions on Computer Systems 16 (2): 133-169 (May 1998), and Lamport, Leslie, Generalized Consensus and Paxos (2005).

Accordingly, a monitor 120 may monitor operational status of one or more of the SDs 115, maintain globally available metadata 122, described in more detail below, about cluster 100 operation and existing storage volumes within the cluster 100, and ensure that other processes have a consistent, up-to-date view of the cluster 100. While the commands to add, remove, and reconfigure volumes or to add and remove SDs 115 must be issued from a client 105, the operations themselves are performed by and run on the monitor 120, with the SDs 115 performing the work of actually storing or moving data.) The monitor 120 generates placement functions and the data upon which placement functions depend, and makes placement functions available as part of cluster 100 metadata 122.

A monitor 120 may be configured to generate one or more placement functions, i.e., programmatic procedures or functions, e.g., in some general purpose algorithmic representation, such that each procedure takes, as its input, an object identifier (such as a number, byte string, or some more complex structure such as an ordered tuple) and returns, as its output, a structure specifying possibly identical, intersecting, or disjoint sets of storage devices to which that object may be stored, upon which the object may be modified, or from which the object may be read.

It is to be understood that, in different configurations, the cluster 100 may not be literally organized as shown in FIG. 1. For example, in a peer-to-peer implementation, the cluster 100 is composed of cooperating peers, each acting as some combination of client 105, SD 115, and monitor 120.

Further, when implemented with so-called "dumb" storage devices embodiment, the storage devices cannot perform arbitrary computations and clients 105 write to multiple devices to perform replication and generate parity. Thus, either clients 105 or some external controller moves data in the event of a device failure.

When implemented with "dumb" clients, clients 105 are incapable of performing arbitrary computations, and either a monitor 120 or some other controller provides the client 105, on request, a map from chunks of a file to object storage device identifiers for some region of a file, such map to be recalled at the occurrence of an event that would invalidate the map.

In a generated hardware implementation, a representation of an electronic circuit required to calculate the value of a placement function including some support data is generated in a hardware description language and this is used to configure, while in operation, hardware in the clients 105 and storage devices 115.

Overview of Placement Functions

The cluster 100 may include computing mechanisms that are capable of generating and processing any formalism sufficient to specify an arbitrary computation, e.g., a placement function. For example, in one implementation, mechanisms generate and process computational formalisms specified in a strict, purely functional language derived from the Revised Report on the Algorithmic Language Scheme, edited by Richard Kelsey, William Clinger, and Jonathan Rees, and available on the Internet at http://schemers.org/Documents/Standards/R5RS/HTML/), with the removal of some features (input/output, load, eval, and similar) and the addition of number theoretic, cryptographic, and hashing operations. While not strictly necessary, a pure functional language allows for various optimizations such as described below, and also addresses some security concerns; further, the addition of various primitives allows more compact and efficient procedures as well as facilitating the use of specialized hardware to accelerate some computations.

Further, arbitrary methods may be used for configuring an object container. For example, such configuration may be input in a computer programming language supplying inference and backtracking, e.g., Prolog or Mercury, in order to better express configuration as a set of constraints and desiderata from which a set of placement functions is to be derived.

Moreover, a description of the cooperative sub-system 116 of SDs 115 is used in both the generation of placement functions and in their evaluation. The description could be formatted in vectors of qualitative information, in particular, the physical topology of SDs 115, storage elements attached at the SD 115 and their properties (esp., storage and input/output capacity), available network interfaces and their throughput capacity, as well as possibly aspects of the available workload capacity of storage elements, network interfaces, or the SD 115 as a whole. A description of the sub-system 116 may be input by an administrator or derived from self-reporting by SDs 115 of their capabilities, or some combination of the two, for example, SDs 115 reporting their capabilities but administrators describing the network topology of the sub-system 116. The monitor sub-system 121 then transforms this description into some suitable form to facilitate efficient, read-only access by placement functions, and makes the description available as part of the global state disseminated to all SDs 115 and clients 105.

Requirements for an object container, e.g., a volume, may include minimum read and write throughput, reliability mechanisms, e.g., number of replicas or parity schemes, reliability guarantees, e.g., detection of inconsistently stored data, ability to recover from loss of some number of machines, constraints on resource usage, e.g., network 110 transmission or storage, minimization or maximization of some characteristic, preferences, or additional minimum or average performance requirements for subsets of objects with varying frequencies of access or total data transfer per time unit. As described in more detail below, the placement functions are generated in accord with solving the constraints; an error is signaled if the constraints cannot be solved given the abilities of the cluster 100 in a reasonable time. An attempt is made to meet minimization, maximization, and preference statements.

Input to a placement function may be an arbitrary key uniquely identifying an object container, as well as the SD sub-system 121 description and topology. This key may be anything of sufficient size to accommodate the total number of objects contained in the distributed storage system, such as an integral value, an arbitrary string of bytes (providing, for example, a name in some human language or a cryptographic hash of the content of the object), or an ordered tuple. In an exemplary implementation, the key is an ordered triple comprised of three numeric identifiers. The first uniquely specifies the container in which the object is stored, the second specifies an identifier for an object (and must be substantially unique within the scope of the container), and the third specifies an object fragment. Fragments allow large objects to be broken up into fixed-size portions that can be read from multiple SDs in parallel or benefit from block parity schemes calculated from multiple fragments. Fragments are indicated by natural numbers starting at zero, such that for a fragment size of s, fragment n contains bytes ns through n(s+1)−1 of the object. An absent fragment is interpreted as a run of s zero bytes.

Further in an exemplary implementation, the members of the tuple are interpretable and significant to the data placement mechanism. As an optimization, placement functions only used on a given container may be disseminated only to SDs storing objects in that container or clients 105 accessing objects in those containers. Object identifiers are used in an exception map, described below, and placement functions may usefully be periodic in the fragment identifier, or to specify parity schemes. To read or write an object fragment, a client 105 constructs an object key that specifies the container, object, and fragment number, or uses some other component in the cluster 100, such as a file system directory server, to acquire such a key, and supplies the object key as input to the appropriate placement function. Placement functions may be organized by container. Further, as an optimization, a table of placement functions may be shared between containers, with each container's functions specified by an index into the table, rather than each container having its own duplicate of a shared function. In general, a client 105 uses the output of the placement function to direct its read or write operation.

Cluster Metadata

Metadata 122 maintained by monitors 120 may include various elements, including a cluster map, placement functions, volumes, and an exception map, sometimes also referred to as an exception table. These elements are described in the following paragraphs.

A cluster map is an enumeration of SDs 115 in the cluster 100, including operational status (e.g., servicing requests, unreachable, etc.) and other properties of the SDs 115. These other properties include such things as properties of hardware (e.g., read and write throughput, maximum capacity, power use, etc.), properties relating to circumstances of installation of an SD 115 (e.g., cost to various network interfaces, from which electrical circuit they are supplied, location within a data center, etc.), assigned properties (e.g., depreciated cost, membership in administrative divisions of the partition such as allocation to a set of users, or security attributes like being usable for one or another kind of data, etc.), and dynamically updated properties set by the cluster 100 (e.g., number of volumes placed on the server, space actually used to hold data and parity, space allocated for future use by placed volumes, etc.). Each SD 115 is addressed by a unique or substantially identifier, e.g., a number that operates as its identity. Accordingly, the cluster map contains information for mapping an SD identifier to an access path such as an IP address.

A placement function, as mentioned above, is a description of a computation to be performed by a client 105 or SD 115 in order to determine a set of SDs 115 to satisfy a read or write request. Objects in the cluster 100 are specified by a (volume; inode; block) triple. An inode is generally a file system object identifier, i.e., it is a numeric identifier supplied a higher or cooperating storage layer, e.g., provided as if constructing a file system on the volume. The cluster 100 metadata 122 includes a collection of placement functions indexed to allow an individual placement function to be referenced. Each placement function includes three elements: an initialization procedure, static data, and the placement function itself. Generation of placement functions is discussed further below.

A placement function's initialization procedure, which may be empty, is called before a placement function is first used, and also when the cluster map 100 is updated, and generally at no other time. The initialization procedure precomputes data required by the placement function, allowing the placement function to run more quickly.

Static data, which may be null or empty, may be generated by the monitor for use by the placement function.

A placement function may accept as input the volume, node, and block numbers of an object, and returns a set of SDs 115. A placement function may also rely on the initialization procedure and static data as arguments as well. A placement function should always returns the same value when supplied with the same inputs.

A placement function may include additional elements or attributes, including further innovations specifying operation of placement function, e.g., arrangements for co-locating data for independent entities, or data that must be kept separately or specially treated (such as patient data), etc. For example, a placement function that is periodic in one or more parameters might specify the variables and period for each so that users can cache data appropriately or export tables to other protocols.

A volume, i.e., container, as used herein, is a set of stored objects logically organized into a unit sharing a storage policy. The cluster 100 metadata 122 contains a list of existing volumes. Cluster 100 metadata 122 for a volume includes whatever information was supplied at volume creation or reconfiguration time (e.g., name, requirements, optimization parameters, etc.), and a reference to the placement function used to locate data within the volume.

An exception table associates placement functions other than the one specified for a volume in metadata 122 with some subset of (inode; block) pairs on that volume. Thus, an exception table provides additional flexibility if, for example, some files in a volume have different access requirements, say, hot spots. (That is, a file in the volume may be accessed more frequently or with specific access patterns which would justify (in consideration of an administrative policy, another property of volumes) constructing a specialized representation for this specific object, e.g., striping it over some number of SDs 115.) An exception table can also serve as a mechanism to allow continued access during volume migration, with an original placement function specified for the volume and a new placement function specified in an exception table entry that is expanded to cover objects as they are moved. When a migration is complete, the entire exception table entry should generally cover the entire volume, the volume entry would be updated to specify the new function, and the exception table entry for the volume is generally removed.

Volume Creation

Two examples of specifying the properties of a volume are provided herein, the first being referred to as the requirements-only method, and the second being referred to as the optimizing method. A requirements-only volume is simpler and allows SDs 115 and clients 105 to take advantage of new capacity in the cluster 100 as it is added and the cluster map is updated. An optimizing volume is more complex and new capacity will only be used when explicitly indicated by the monitor 120 (likely in response to some administrative action.) In all cases an administrator may specify a number of replicas, maximum expected capacity, name, ownership, and other properties of the volume that are independent of its specific placement. The administrator may also specify two periods, one for the inode number and one for the block number.

For the function to be periodic in the block number with a period of p means that when the volume and inode numbers v and i are held constant and the block number b is increased monotonically, then f(v; i; b)=f(v; i; p+b). Intuitively, this means that we can write a table containing p entries that will give every result off for any block number for a given volume and inode.

For both examples of specifying the properties of a volume, we modify the $RUSH_T$ algorithm to make it more suitable for a heterogeneous cluster 100. The $RUSH_T$ algorithm is described in Honicky, R. J. and Ethen L. Miller, "Replication Under Scalable Hashing: A Family of Algorithms for Decentralized Data Distribution," Proceedings of the 18th International Parallel and Distributed Processing Symposium, Santa Fe, N. Mex. April 3004, found online at http://www.ssrc.ucsc.edu/Papers/honicky-ipdps04.pdf. The purpose of $RUSH_T$ and the modification described herein is to associate, given some number acting as an identifier and a weighted set of SDs 115, some number of SDs 115 drawn from the cluster 100 (with the chance of a particular SD 115 being drawn proportional to its weight) with the identifier.

Both $RUSH_T$ and the modification thereof being presently described rely on arranging the set of SDs 115 into a binary tree where each node has a label (a label whose only use is in the context of the tree, not the SD 115 identifier used globally in the cluster 100 pool) such that the weight of an interior node is the sum of the weights of its left and right children and that the label of the left child always be less than the label of the parent which must always be less than the label of the right child. This tree structure makes it possible to move only a small subset of data when a set of SDs 115 is modified by addition, removal, or reweighting. It is to be understood that other mechanisms for evaluating SDs 115 are possible, and that such mechanisms may or may not employ binary trees.

Pseudocode for the modified algorithm is provided below. The modification differs from $RUSH_T$ primarily in that it removes the second step in which $RUSH_T$ places a replica within the subcluster. Instead, it places all replicas at once, using modified versions of weights in its hash and compares so that the weight of a previously selected node is treated as if it were zero. The modification also differs from $RUSH_T$ in that, while it collapses an identifier into a single scalar, it uses a modulus on the inode and block identifiers to enforce a period on the results of the function.

The pseudocode is as follows:

```
Let hash(v,i,b) be a uniform hash of its arguments
Let boundedHash(x,l,r,bound) be a uniform hash no greater than bound
Let T be the root of the tree specified above
Let r_count be the number of replicas to generate
Let P_i be the inode period
Let P_b be the block period
Then let placeReplicas(n,k,R), where n is a node in the tree, k is the
mingled number derived from the (v,i,b) triple, and R is a possibly empty
list of leaves corresponding to replicas, be defined thus:
    if length(R) = r_count
        return R
    else
        if node is a leaf
            return placeReplicas(T,k,(R|node))
        else
            let weight_T be T.weight minus the sum of the weights of all
        nodes in R and
            let weight_l be n.left.weight minus the sum of the weights of
        the nodes in R whose labels are less than the label of n and
            let next be n.left if bound(k,node.label,length(R),weight_t) <
        weight_l and n.right; otherwise return placeReplicas(next,k,R)
And let cohortRush(v,i,b), where v is a volume number, i is the inode
number, and b is the block number, be defined thus:
    let k be hash(v,i mod p_i,b mod p_b)
    let R be placeReplicas(T,k,[ ])
        return a list containing the SD ID of every node in R.
END
```

Figure 2:
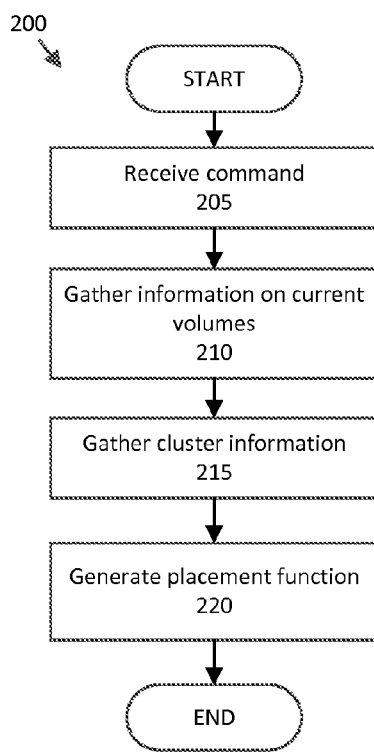
FIG. 2 illustrates an exemplary process for generating a placement function.

FIG. 2 illustrates an exemplary process 200 for generating a placement function. The process 200 is generally carried out by one or more elements of monitor subsystem 121. For example, in the exemplary implementation of the process 200 discussed below, the process 200 is carried out by a monitor 120.

The process 200 begins in a step 205, in which administrator provides input to a monitor 120 to in some way alter available data storage in the cluster 100, e.g., to create, modify, or reconfigure a volume, or to add, remove, or reconfigure storage devices 115. An administrator-provided input generally also includes a set of requirements, constraints, and/or desired qualities for storing data. These parameters may include performance requirements, space requirements, data location requirements, etc., or may be empty in the case where a volume is being removed, or where a SD 115 is being added, removed or reconfigured. As an alternative to being supplied by an administrator, the command could be issued, and parameters provided, by an automated process, e.g., a process running on a monitor 120.

Next, in a step 210, the monitor 120 gathers information about pre-existing volumes, or other volumes in the case where a volume is being modified. This information includes requirements or parameters already established for the pre-existing volumes, capacity (used and reserved) of these volumes, and current realizations of pre-existing volumes, e.g., a concrete set of storage devices on which a volume is stored or a set of generated placement functions were those lines.

Next, in a step 215, the monitor 120 gathers information about the cluster 100. This information includes information relating to devices in the cluster, e.g., an enumeration of all machines, e.g., clients 105, SDs 115, monitors 120, etc., in the cluster 100, along with their properties, e.g., capacity, connections to each other, membership in various partitions, performance, etc. Cluster information also may include statistical information about use of cluster 100, e.g., which data are accessed most heavily, which storage devices are used as or close to capacity, etc.

Next, in a step 220, the monitor 120 uses inputs provided in steps 205-215 is, in one or more placement functions. Each placement function includes a formal representation that, as discussed herein, may be compile to computer executable instructions, generally along with supporting data, where such instructions are generally of small size and quick to execute, and realizes requirements provided by an administrator in step 205 in the context of inputs provided in steps 210 and 215 to map a subset of possible object identifiers to set of SDs 115 on which objects are to be read or written.

Following step 220, the process 200 ends.

Figure 3:
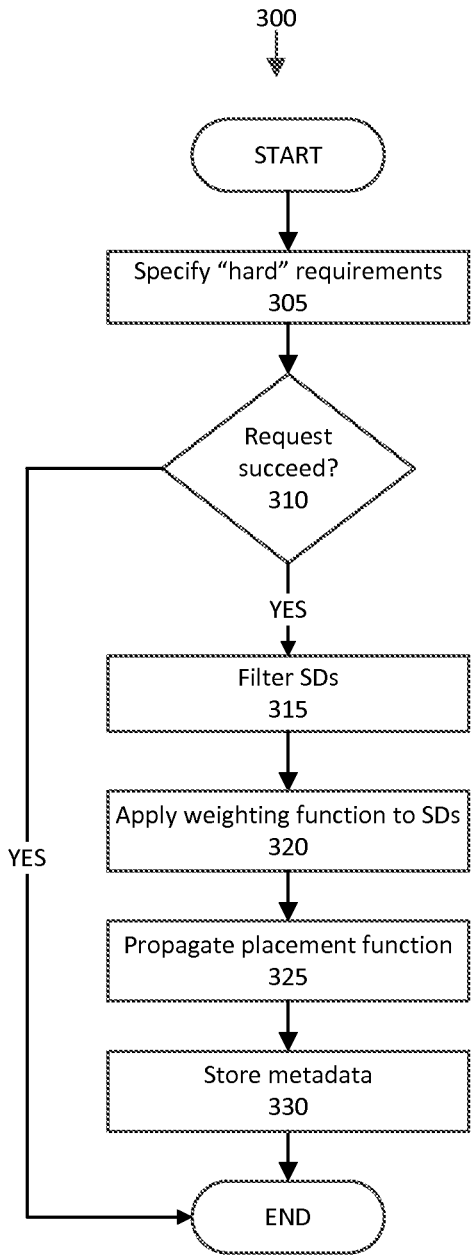
FIG. 3 illustrates an exemplary process for creating a requirement-only volume.
Figure 4:
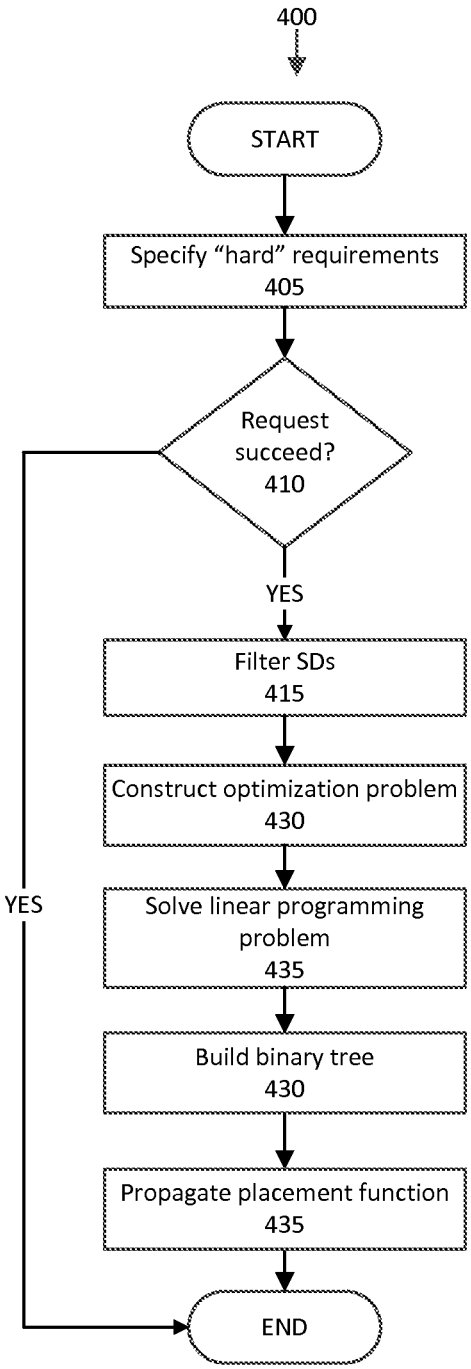
FIG. 4 illustrates an exemplary process for creating an optimizing volume.

FIG. 3 illustrates an exemplary process 300 for creating a requirements volume, i.e., container.

The process 300 begins in a step 305, in which an administrator may establish a request that includes parameters for the volume, e.g., specify any so-called "hard" requirements that apply individually to the SDs 115 potentially used to store a volume. For example, an administrator, e.g., via a client 105, might specify that a volume of ten terabytes be stored only on SDs 115 allocated to Netflix, each SD 115 having a throughput of at least two gigabytes, and each SD 115 having a cost less than a certain amount to interfaces to the Eastern United States.

Next, in a step 310, monitor 120, upon receiving a request such as described with respect to step 305, checks that SDs 115 with sufficient capacity to fulfill the needs of the volume exist in the cluster 100 and satisfy the requirements. If this request fails, the process 300 ends, generally after the monitor 120 signals an error. Otherwise control proceeds to step 315.

In step 315, the monitor 120 creates a function to filter SDs 115 to yield a subset of all SDs 115 in the cluster 100 meet volume requirements as specified in step 305. The monitor 120 modifies metadata 122 accordingly, and increments a count of volumes placed on all SDs 115 in a subset that has passed the filter requirements.

Next, in a step 320, for each SD 115 in the subset identified as described above with respect to step 315, using some criteria, such as the number of volumes already placed on the SD 115, or space allocated on the SD 115, the monitor 115 creates a weighting function for the SD 115. Other criteria might also be used; for example, if an administrator were planning to retire some set of SDs 115 in a month's time, that administrator could gradually decrease the weights of those SDs 115. In any case, if the size of the volume has been specified, the monitor 115 modifies a cluster map in the metadata 122, increasing the allocated space in accord with the weight of the SDs 115.

Next, in a step 325, the monitor 120 propagates a placement function. That is, the filtering and the weighting function discussed above are incorporated into a function to generate the tree required by the RUSH variant discussed above, and this tree is then packaged into an initialization function. The static data is left empty, and the RUSH variant is included as the placement function for the volume in metadata 122 as stated below.

Next, in a step 330, the name, ownership, possibly other information, and the just-generated placement function are stored in the cluster 100 metadata 122 in association with the volume. Creation of the volume is complete, whereupon the process 300 ends.

FIG. 3 illustrates an exemplary process 400 for creating an optimizing volume. An optimizing volume is based on not only a set of individual SD 115 requirements, but also on a set of hard bounds on aggregate properties, a set of factors to be maximized or minimized, and preferences that are collectively combined into an objective function. Optimizing volumes give an administrator much control over aspects of placement in terms of policy, but remove the ability of SDs 115 to respond to the addition of new hardware.

The process 400 begins in a process 405 that is similar to step 305 of process 300 described above.

Next, process 400 includes a step 410 similar to step 310 described above. If the request fails, the process 400 ends, generally after the monitor 120 signals an error. Otherwise control proceeds to step 415.

In step 415, the cluster 100 of SDs 115 is filtered according to the hard requirements specified by an administrator such as described above. This filtering yields a subset of permissible SDs 115 for use in the volume.

Next, in a step 420, an optimization problem is constructed. For example, from bounding conditions and goals such as described above, the monitor 120 constructs a binary linear programming problem. A matrix is constructed from the supplied bounding constraints and the properties specified for each SD 115 in the cluster 100, and goals are similarly built from linear combinations of vectors of properties. Mathematically, constructing the objective function this way is not difficult; however, as a practical matter, administrators are unlikely to be able to provide useful values if asked to provide precise measures of importance for more than two or three of competing factors. Therefore, to make best use of this capability, one implementation uses heuristics and instrumentation of the SDs 115 to provide feedback.

For example, it is possible to balance the relative importance of total SD 115 costs, energy usage, and "spread" (how many total SDs 115 the data for a volume could be stored in)

against each other differently depending on an administrator's inputs or automatic monitoring of the cluster 100. In reconfiguring a volume, if the system detected that the storage devices used to host the volume had been taxed by multiple competing requests for data from the same volume for other sources, then the "spread" (simply the sum of all variables in the linear program) of the objective function could be given a higher weight. On the other hand, if measurement showed the volume was accessed by relatively few clients simultaneously and that SDs 115 were taxed by requests for data from other volumes, the weight placed on "spread" could be decreased and a high negative weight term giving the sum of other volumes placed on an SD 115 could be added as well.

Similarly, if an administrator knew (or inspection showed) that SDs 115 satisfying filter predicates on a volume were fairly uniform in cost (or differed in cost markedly but were of similar capability) then the weight of storage device cost should be reduced markedly relative to a high weight operational energy cost.

A useful heuristic in reconfiguring a volume would be to take a maximum acceptable amount of data to be moved in the reconfiguration and solve a relaxation of the linear program several times, performing a binary search on the weight of the 'affinity' term (a +1 coefficient on variables corresponding to storage devices currently hosting data from the volume), to find a weight that would yield a total amount of data moved in reconfiguration close to but less than the maximum.

In any case, the linear program so constructed is a binary linear program with one variable for every SD 115 remaining in the set after filtering. Each variable can be either one, indicating that the corresponding SD 115 is to be used to store the volume, or zero, indicating that the corresponding SD 115 is not to be used to store the value. The solution to the linear program is effectively the set of SDs 115 on which data and parity in the volume are to be stored.

Next, in a step 425, the optimization, e.g., the linear programming problem is solved. In general, solving a binary linear program is NP-hard. Some typical binary linear programs are tractable and testing has shown that satisfying requirements with only a few bounds on clusters of a hundred thousand SDs 115 was usable. However, it will be understood that finding an exact solution is not tractable in all cases, in which case options may include may relaxing the model, refusing to create the volume, or making some different decision as may be determined according to administrative policy.

Considerable research has been done on relaxations of integer and binary linear programs. A relaxation of our linear programming problem is one in which a solution can have any value between zero and one, rather than confining them to zero or one exclusively. Relaxing this constraint with no other change can result in undesirable solutions. There has been work on modifying relaxations of linear programming problems, including data placement problems, in order to guarantee that their solutions are within certain bounds of optimality. For example, Baev, I. and Rajmohan Rajaraman, "Approximation Algorithms for Data Placement in Arbitrary networks," http://www.ccs.neu.edu/home/rraj/Pubs/place.ps, fully incorporated herein by reference in its entirely, explains a rounding approach that bounds error and makes error that occurs favor the less bad direction of deviation. One implementation employs such relaxations in the solutions of all such optimized data placement problems, using a heuristic to decide when to attempt an exact solution to the binary program.

In either case, there are many freely available systems to solve linear programming problems efficiently. Once the problem has been generated and modified, one of these is used to find the solution, e.g., the COIN-OR SYMPHONY package, found at https://projects.coin-or.org/SYMPHONY.

Next, in a step 430, monitor 120 builds a binary tree representing SDs 115 as described above. For an optimizing volume, SDs 115 cannot respond to changes in the cluster 100 on their own, so there is no sense in providing them with an initialization function. Instead, the monitor builds a binary tree, as discussed above, from all of the SDs 115 that were specified by the solution to the optimization problem above, using whatever weighting function is appropriate. As above, a useful example would be weighting SDs 115 based on their available capacity.)

Next, in a step 435, here, the placement function uses the RUSH variant described above as the placement function, with no initialization function, and the statically constructed tree. The new optimizing volume is recorded accordingly, pointing to the newly stored placement function, whereupon volume creation is complete, and the process 400 ends.

Next, in a step 335, here, the placement function uses the RUSH variant described above as the placement function, with no initialization function, and the statically constructed tree. The new optimizing volume is recorded accordingly, pointing to the newly stored placement function, whereupon volume creation is complete, and the process 300 ends.

Placement Function Consumption

Figure 5:
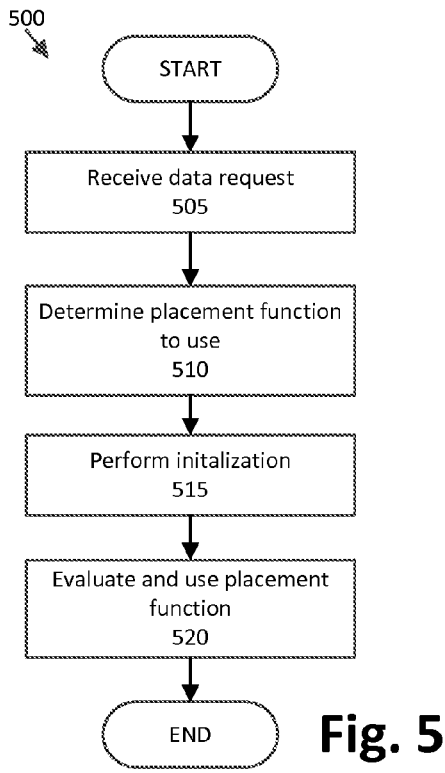
FIG. 5 illustrates an exemplary process for placement function consumption.

FIG. 5 illustrates an exemplary process 500 for placement function consumption. Clients 105 and SDs 115 are consumers of placement functions. A client 105 uses a placement function to determine which SDs 115 to use to access a given object. SDs 115 use placement functions to determine which other SDs 115 need to be sent replicating writes or copy requests. While clients 105 and SDs 115 use the placement function value for different purposes, the way the value is calculated is generally identical.

The process 500 begins in a step 505, in which a client 105 or SD 115 receives a request for a data operation, e.g., a read/write operation. The request could be specified in a variety of formats; in the exemplary implementation being discussed the request generally specifies an object (e.g., an inode, discussed above), and an offset into a sequence of bytes stored in the object.

Next, in a step 510, a placement function is determined by consulting metadata 122. If the exception table in metadata 122 has changed since the last time it was consulted, then the process 500 looks up the (volume; inode; block) triple in the exception table. If found, the exception table entry is used. Otherwise, the placement function specified in the metadata 122 for the specified container (i.e., volume) is used.

Next, in a step 515, the placement function determined in step 505 is initialized. If the function reference has not been looked up previously, or if the function list has been modified since it was last used, the placement function is downloaded from the placement function list.

If the placement function has not yet been used or the cluster map has changed since the last time it was used, the initialization portion of the placement function is executed. The placement function itself may be compiled or otherwise optimized with respect to the static data and the result of the initialization function. In one implementation, a partial evaluating compiler links generated functions into the address space of the device consuming the placement function.

Next, in a step 520, the placement function is used. A placement function generally supplies as output one or more vectors of SDs 115. Each vector generally identifies SDs 115 to which data may be written, from which data may be read, to which parity data may be written, and/or from which parity data may be read. Accordingly, a client 105 (or an SD 115)

may direct a read or write operation to a SD 115, using a probabilistic mechanism, such as discussed above, weighted with the priority associated with the SD 115. If the operation fails due to a communications failure or a fault in the SD 115, rather than an error signaled in response to the request, the client 105 may then redirect its operation to another SD 115. For expedient access to fragments in parallel, if the function is periodic as discussed above, in a fragment identifier with period n, the client may then select at most n distinct SDs 115 from which data may be read or to which it may be written in parallel, without central coordination or interference.

To determine the list of replicating SDs 115 for an object, the placement function is evaluated with the volume, inode, and block specifiers. The result of this value may be cached, and if the function is periodic in some value, the consumer may make use of this fact in serving requests for blocks congruent to the cached value or to populate the cache with the entire pattern for a file.

Cached values must abide by lifetime rules. First, if the exception table changes, the consumer must check that the (volume; inode; block) triple is not governed by some other function. Even if it is, other portions of the same file may still be governed by the original, and the cached values could be used to serve them.

If the volume changes so as to specify a different function or the function corresponding to the index into the list of placement functions changes, the cache of results is invalidated and the initialization step (410) is repeated.

If the placement function has a non-trivial initialization procedure and the cluster map changes, the initialization procedure is re-run and the cache is invalidated. However, if the initialization function is empty, such as for optimizing volumes, then neither invalidation nor re-initialization is required.

As stated above, a SD 115 may direct a read or write request. When the SD 115 receives a write request for an object key, it initiates replication of the given object to all other SDs 115 in the read vector for that key. Similarly, when a placement function indicates one or more parity schemes for an object key, the SD 115 receiving a write request for that key signals the SD 115 holding the first key of each parity list to begin a distributed recalculation of parity.

When a SD 115 is notified of a change of global state, or a change relevant to a container some of whose objects it holds, that SD 115 should take the value of the placement function for the key of every object it holds, signal any SD 115 newly added to the read vector with an offer to begin replication, and once all accepted replications have been complete, flush any objects from itself for which it no longer appears in the read vector.

Following step 515, the process 500 ends.

Cluster Configuration and Reconfiguration

Figure 6:
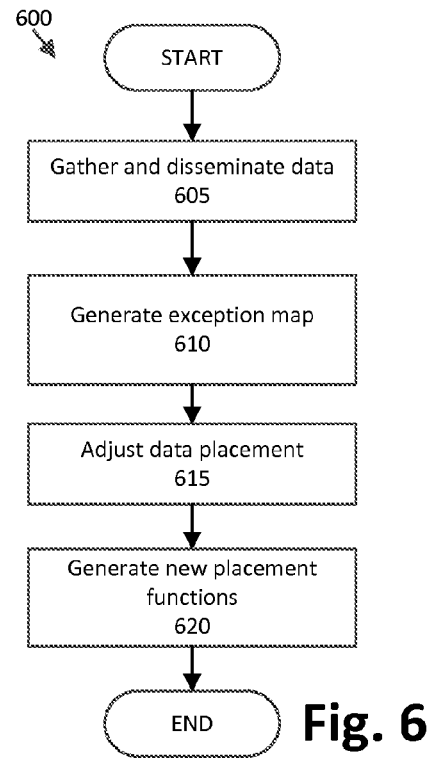
FIG. 6 illustrates an exemplary process for generating exception maps.

FIG. 6 illustrates an exemplary process 600 for generating exception maps. In general, cluster 100 may be thought of as having a global state that includes two portions. A first portion may include placement functions and cluster composition and topology. A change in this first portion may require a complete recompilation of the placement functions on all clients 105. Conversely, a change in a second portion that is composed of the exception map requires invalidation of all memorized results of the placement functions on the changed volume.

Monitors 120 may be queried individually by clients 105 or SDs 115 to retrieve some portion or all of this global state, or they may disseminate changes in the state outward to subscribing clients or SDs.

In any event, the process 600 begins in a step 605, in which SDs 115 implement a mechanism to collectively gather, and regularly disseminate to the monitor sub-system 121, information concerning data accesses. This information may include but is not limited to number of reads or writes specifying some combination of volume, object, or fragment identifier per second, or the same for given quantity of data read or written with some combination of volume, object, or fragment identifier specified, the source of requests (client identifier or requests summed over subnet from or channel through which they were received), or times of peak access.

Next, in a step 610, monitors 120 may use the forgoing statistics to periodically generate and disseminate exception tables, which includes associating generating and associating placement functions with containers as explained above. Each container may have at most one exception table, sometimes referred to as an exception map, which, as also explained above, pair object identifiers with placement functions.

Next, in a step 615, the monitors 120 may efficiently adjust data placement to respond to dynamically observed patterns of access with the goal of meeting requirements for minimum performance of the most accessed data in a container. Monitors 120 may both pre-generate placement functions with the expectation of later use and move objects under their jurisdiction. For example, monitors 120 may generate a placement function at container-specification time that makes use of SDs 115 providing SSD or DRAM storage and dynamically record and disseminate exceptions to cause more frequently written object identifiers to be under the jurisdiction of these placement functions in response to reported load.

Additionally or alternatively, in a step 620, monitors 120 may generate and disseminate new functions together with functions' exceptions in response to load information. For example, monitors 120 may generate and disseminate a placement function causing replicas to be stored on SDs topologically near an interface, and generate and disseminate exceptions that specify the use of this function for object identifiers in response to large volumes of data being read from those objects by clients accessing the storage system through that interface. In changing the placement function for a given object, monitors 120 generally use techniques to find an approximately minimal number of object transfers required to gain the required advantage, as in a paper by Ivan D. Baev, Rajmohan Rajaraman and Chaitanya Swamy, entitled Approximation Algorithms for Data Placement Problems and found on the Internet at www.ccs.neu.edu/home/rraj/Pubs/dataplmt-journ.pdf.

Following step 620, the process 600 ends.

As mentioned above, use of optimizations is one factor weighing in favor of a strict, functional language as the formalism for procedurally specifying data placement discussed above. As such, on both clients 105 and SDs 115, when new placement functions or cluster 100 description and topology are received, the placement functions may be compiled and aggressively optimized with a globally optimizing and partially evaluating compiler (as exists in J. M. Siskind's implementation of the Scheme language, STALIN, information concerning which may be found, for example, at ftp://ftp.ecn.purdue.edu/qobi/research-statement.pdf). As such, each monitor 120 is generally configured to pre-generate placement functions whenever possible, so that the high computational cost of such optimizations may be borne infrequently, preferably only on the event of addition or removal of SDs 120 from cluster 100. After the set of placement functions is compiled to native code, it is linked into the executable space of the software included in the client 105 or SD 115, allowing each function to be called with comparable efficiency to one included in the original code for the SD 115 or client 105.

Additionally, both SDs 115 and clients 105 shall generally be designed configured to keep a record of the read, write, and parity structures for the most recently accessed object fragments. The purely functional nature of the placement procedure guarantees that each output of the placement procedure (that is, each set of SDs 115 by which one may access an object) need be calculated only once for a given input. This technique (saving the result of a computation) is known as memoization Consequently, for example, more frequent changes for dynamic load balancing need only invalidate the stored vectors for the most recently accessed keys on a client 105 or SD 115, while leaving the much more expensive compilation and compilation to occur less frequently.

Requirement-only volumes and optimizing volumes, the two exemplary types of volumes discussed herein, differ markedly in their response to reconfiguration or a change in the makeup of the cluster 100.

Turning first to requirement-only volumes, consider a change in cluster 100 configuration. The $RUSH_T$ algorithm and the modification thereof disclosed above are within some bound of optimal in the amount of data moved on a change in the cluster 100 so long as the binary tree it traverses in its operation is modified stably. In the present example, the tree is not modified. Instead, a new tree is generated on each initialization, discarding any past state of the tree. However, so long as a number of SDs 115 is unchanged, we can create a tree from scratch that is identical to one that would be created by taking the old tree and modifying it by pruning or adjoining to the original tree.

Therefore, clients 105 can access data and parity at the right location by re-running the initialization portion of the placement functions under a new cluster 100 map. Similarly, SDs 115 can know who their replication partners are. The details of actually performing the data migration from old to new SDs 115 and ensuring access to data in transit will be known to the ordinarily skilled artisan.

Further, a change in the configuration of a requirement-only volume results in a change to either the filter function or the weighting function described above.

If the result of the old filtering function largely overlaps that of a new one, then as far as data movement is concerned, this change to the filter function corresponds to the addition or removal (or both) of SDs 115 with the same general performance capabilities. If the result of the old and new filtering functions are mostly disjoint, data movement is perforce large.

Changing the weight function may have similar effects. An optimal movement on reweighting would move just enough data to bring the cluster 100 into a configuration where the data and parity are distributed proportionally to the new weights and the modified $RUSH_T$ performs within some bound of optimally. However, drastic changes to the weights of a large subset of SDs 115 may require large amounts of data movement.

For optimizing volumes, because the set of SDs 115 to be used is determined by the solution of a linear program at creation or reconfiguration time, all changes are effectively reconfigurations.

A reconfiguration is performed by taking new volume requirements and constructing and solving a linear program. In the case of adjusting the volume to the addition or removal of some number of SDs 115, the same requirements are used, and the new set of SDs 115 is used to construct a tree. If there is a large overlap in the old and new sets, the tree will be mostly identical (as above) and the amount of data that must be moved will be small.

However, even small changes in configuration (or small changes in the cluster 100 with configuration unchanged) can result in large changes in the set of SDs 115 found to be optimal. It is possible to explicitly retreat from optimality to reduce data movement by adding a bias vector (for example, with a value of one for every value in the old SD 115 set and negative one for every value not in the solution) weighted appropriately to bias the new solution appropriately against changing the set of SDs 115. By forcing an overlap, the amount of data to be moved is reduced. This reconfiguration can be re-run repeatedly over time to gradually move the cluster 100 to a more optimal placement for the given volume.

Computing devices such as, etc. may employ any of a number of computer operating systems known to those skilled in the art, including, but by no means limited to, known versions and/or varieties of the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, Apple OS-X Operating Systems, and/or Mobile and Tablet Operating Systems such as Android, from the Open Handset Alliance consortium (including Google), and Apple's iOS for iPad, iPhone and iPod Touch. Computing devices may include any one of a number of computing devices known to those skilled in the art, including, without limitation, a computer workstation, a desktop, notebook, laptop, tablet computer, smartphone, or handheld computer, or some other computing device known to those skilled in the art.

Computing devices such as the foregoing generally each include instructions executable by one or more computing devices such as those listed above. Computer-executable instructions may be compiled or interpreted from computer programs created using a variety of programming languages and/or technologies known to those skilled in the art, including, without limitation, and either alone or in combination, Java™, C, C++, Visual Basic, Java Script, Python, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of known computer-readable media.

A computer-readable medium includes any medium that participates in providing data (e.g., instructions), which may be read by a computer. Such a medium may take many forms, including, but not limited to, non-volatile media, volatile media, and transmission media. Non-volatile media include, for example, optical or magnetic disks and other persistent memory. Volatile media include dynamic random access memory (DRAM), which typically constitutes a main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, Blu-Ray, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A system, comprising:
    a monitor computing device that includes a processor and a memory, the memory including instructions executable by the processor, the instructions including instructions for:
    receiving user input including a command to alter data storage in a cluster, along with parameters for executing the command;
    obtaining information, from one or more other computing devices, relating to one or more volumes in the cluster and information relating to devices in the cluster;
    generating, in the monitor computing device, and without receiving further user input, a formal description of a placement function that maps one or more object identifiers to a storage device set based on the information obtained from one or more other computing devices relating to one or more volumes in the cluster and devices in the cluster;
    generating placement function code by compiling the formal description of the placement function to computer-executable code; and
    at least one second device that includes a second processor and a second memory, the second memory configured to store the placement function code, and the second processor configured to execute the placement function code.

2. The system of claim 1, the instructions in the monitor computing device further including instructions for executing the placement function code.

3. The system of claim 1, the instructions in the monitor computing device further including instructions for storing the placement function in an exception table that associates the placement functions with a volume for which the placement function was not specified with a location in the container for which the placement function was not specified.

4. The system of claim 1, wherein the parameters include at least one of a performance requirement, a space requirement, and a data location requirement.

5. The system of claim 1, wherein the information relating to one or more volumes in the cluster includes at least one of parameters already established for pre-existing volumes, capacity of pre-existing volumes, and current realizations of pre-existing volumes.

6. The system of claim 1, wherein the information relating to devices in the cluster includes at least one of an enumeration of devices in the cluster, capacity of devices in the cluster, connections of devices in the cluster to each other, devices' membership in partitions, devices' performance, and include statistical information about use of the cluster.

7. The system of claim 1, wherein generating the placement function includes representing a set of storage devices from the cluster in a binary tree.

8. A system, comprising:
    a storage device that includes a processor and a memory, the memory including instructions executable by the processor, the instructions including instructions for:
    receiving a request for a data operation, the data operation including either reading or writing data in a specified first volume,
    determining whether a placement function for the data is found in an exception table that associates a placement function with a container, the placement function specifying at least one second volume for storing data in the storage device;
    if a placement function is found in the exception table, using the placement function to perform the requested operation using the second volume;
    if a placement function is not found in the exception table, using a placement function found in metadata for the first volume to perform the requested operation.

9. The system of claim 8, the instructions further comprising instructions for, if the requested operation is a write operation, identifying a second storage device in a parity list for the data, and signaling the second storage device to perform replication based on the operation.

10. A method, comprising:
    receiving, in a monitor computing device, user input including a command to alter data storage in a cluster, along with parameters for executing the command;
    obtaining information, from one or more other computing devices, relating to one or more volumes in the cluster and information relating to devices in the cluster;
    generating, in the monitor computing device, and without receiving further user input, a formal description of a placement function that maps one or more object identifiers to a storage device set based on the information obtained from one or more other computing devices relating to one or more volumes in the cluster and devices in the cluster;
    generating placement function code by compiling the formal description of the placement function to computer-executable code;

sending the placement function code to at least one second device; and executing the placement function code on the second device.

11. The method of claim 10, further comprising executing the placement function code in the monitor computing device.

12. The method of claim 10, further comprising storing the placement function in an exception table that associates the placement functions with a volume for which the placement function was not specified with a location in the container for which the placement function was not specified.

13. The method of claim 10, wherein the parameters include at least one of a performance requirement, a space requirement, and a data location requirement.

14. The method of claim 10, wherein the information relating to one or more volumes in the cluster includes at least one of parameters already established for pre-existing volumes, capacity of pre-existing volumes, and current realizations of pre-existing volumes.

15. The method of claim 10, wherein the information relating to devices in the cluster includes at least one of an enumeration of devices in the cluster, capacity of devices in the cluster, connections of devices in the cluster to each other, devices' membership in partitions, devices' performance, and include statistical information about use of the cluster.

16. The method of claim 10, wherein generating the placement function includes representing a set of storage devices from the cluster in a binary tree.

17. A method, comprising:

receiving a request for a data operation, the data operation including either reading or writing data in a specified first volume, determining whether a placement function for the data is found in an exception table that associates a placement function with a container, the placement function specifying at least one second volume for storing data in the storage device;

if a placement function is found in the exception table, using the placement function to perform the requested operation using the second volume;

if a placement function is not found in the exception table, using a placement function found in metadata for the first volume to perform the requested operation.

18. The method of claim 17, further comprising determining if the requested operation is a write operation, and, if the requested operation is a write operation, identifying a second storage device in a parity list for the data, and signaling the second storage device to perform replication based on the operation.

19. A system, comprising:

a first device that includes a processor and a memory, the memory including instructions executable by the processor, the instructions including instructions for:

receiving user input including a command to alter data storage in a cluster, along with parameters for executing the command;

obtaining information, from one or more other computing devices, relating to one or more volumes in the cluster and information relating to devices in the cluster;

generating, in the monitor computing device, and without receiving further user input, a formal description of a placement function that maps one or more object identifiers to a storage device set based on the information obtained from one or more other computing devices relating to one or more volumes in the cluster and devices in the cluster; and sending the formal description of the placement function to a second device; and the second device, including a processor and a memory, the memory including instructions executable by the processor, the instructions including instructions for:

generating placement function code by compiling the formal description of the placement function to computer-executable code.

* * * * *